United States Patent
Degenstein et al.

(10) Patent No.: US 8,827,128 B2
(45) Date of Patent: Sep. 9, 2014

(54) CARGO CARRIER SYSTEM FOR A MOTOR VEHICLE WITH INTEGRATED ENERGY SUPPLY DEVICE

(75) Inventors: Thomas Degenstein, Mainz (DE); Carsten Glaser, Muehltal (DE); Felice De Rogatis, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 223 days.

(21) Appl. No.: 13/371,586

(22) Filed: Feb. 13, 2012

(65) Prior Publication Data

US 2012/0205413 A1 Aug. 16, 2012

(30) Foreign Application Priority Data

Feb. 15, 2011 (DE) .......................... 10 2011 011 252

(51) Int. Cl.
*B60R 9/06* (2006.01)
*B60L 11/18* (2006.01)
*B60R 9/10* (2006.01)
*B60L 11/00* (2006.01)

(52) U.S. Cl.
CPC ............. *B60R 9/06* (2013.01); *Y02T 10/7005* (2013.01); *B60L 11/1816* (2013.01); *B60R 9/10* (2013.01); *Y02T 10/7088* (2013.01); *Y02T 90/121* (2013.01); *Y02T 90/14* (2013.01); *B60L 2200/12* (2013.01); *B60L 2270/40* (2013.01); *B60L 11/007* (2013.01); *Y10S 224/924* (2013.01)
USPC ............ 224/496; 224/510; 224/924; 320/104

(58) Field of Classification Search
USPC ................ 224/924, 512, 545, 567, 489, 491, 224/495–497, 281, 510; 320/103–105, 109; 280/422
See application file for complete search history.

(56) References Cited

U.S. PATENT DOCUMENTS

| | | | |
|---|---|---|---|
| 3,400,293 A * | 9/1968 | Reichardt | 313/318.01 |
| 3,904,948 A * | 9/1975 | Earle | 322/7 |
| 6,037,746 A * | 3/2000 | Sheng et al. | 320/104 |
| 6,218,804 B1 * | 4/2001 | Toriyama et al. | 320/104 |
| 7,726,160 B2 * | 6/2010 | Gagosz et al. | 70/233 |
| 8,188,704 B2 * | 5/2012 | Reese et al. | 320/104 |
| 2007/0102465 A1 | 5/2007 | Wezyk et al. | |
| 2008/0006665 A1 * | 1/2008 | Bergerhoff et al. | 224/497 |

(Continued)

FOREIGN PATENT DOCUMENTS

| | | |
|---|---|---|
| DE | 29723276 U1 | 11/1998 |
| DE | 10052643 A1 | 5/2002 |

(Continued)

OTHER PUBLICATIONS

UK IPO, British Search Report for Application No. 1201208.4, dated May 16, 2012.

(Continued)

*Primary Examiner* — Justin Larson
*Assistant Examiner* — Phillip Schmidt
(74) *Attorney, Agent, or Firm* — Ingrassia Fisher & Lorenz, P.C.

(57) ABSTRACT

A cargo carrier system is presented for a motor vehicle with a supporting frame for accommodating at least one object and with an energy supply device for supplying the object accommodated on the supporting frame with electric energy.

9 Claims, 4 Drawing Sheets

(56) References Cited

U.S. PATENT DOCUMENTS

2010/0045012 A1    2/2010   Lungershausen et al.
2010/0084532 A1*   4/2010   Nielsen et al. ............ 248/346.03
2013/0249468 A1*   9/2013   Bajjuri et al. ................. 320/104

FOREIGN PATENT DOCUMENTS

| | | |
|---|---|---|
| DE | 10257903 A1 | 6/2004 |
| DE | 202007012506 U1 | 12/2007 |
| DE | 602005000912 T2 | 1/2008 |
| DE | 102007017164 A1 | 10/2008 |
| DE | 102009001082 A1 | 8/2010 |
| DE | 202010012542 U1 | 11/2010 |
| EP | 1609678 A1 | 12/2005 |
| GB | 2424636 A | 10/2006 |
| NL | 1035914 C2 | 7/2009 |
| WO | 0026059 A2 | 5/2000 |
| WO | 2010131983 A1 | 11/2010 |

OTHER PUBLICATIONS

German Patent Office, German Search Report for Application No. 102011011252.9, dated Sep. 29, 2011.

* cited by examiner

CARGO CARRIER SYSTEM FOR A MOTOR VEHICLE WITH INTEGRATED ENERGY SUPPLY DEVICE

CROSS-REFERENCE TO RELATED APPLICATION

This application claims priority to German Patent Application No. 10 2011 011 252.9, filed Feb. 15, 2011, which is incorporated herein by reference in its entirety.

TECHNICAL FIELD

The technical field pertains to a cargo carrier system, particularly for the rear end of a motor vehicle. The cargo carrier system is configured to accommodate at least one object, preferably one or more electric bicycles or electric scooters.

BACKGROUND

There exist various cargo carrier systems for motor vehicles, e.g., for carrying along one or more bicycles or similar means of transportation. For example, DE 10 2007 017 164 A1 discloses a cargo carrier that is pulled out of the rear end of a motor vehicle. A supporting frame is guided through the bumper of the motor vehicle or underneath the bumper of the motor vehicle on at least one oblong element that is equipped with a pivoting axis and can be longitudinally displaced.

Such cargo carriers that are integrated into the motor vehicle body or otherwise attached thereto, e.g., in a detachable fashion, allow a particularly simple handling. For example, the carriers are transferable from an idle position, in which carrier is not visible to an observer from the outside, into an extended operative position, in which one or more objects such as bicycles can be fixed on the cargo carrier in order to be carried along on the motor vehicle. In the bicycle sector, in particular, electric bicycles that feature at least one electrically operated auxiliary motor are becoming more and more popular. However, the range of such electric (auxiliary) drives is limited by the charging capacity of storage batteries to be carried along.

In view of the foregoing, at least one objective is to make available an improved cargo carrier system for motor vehicles that is better adapted to the special requirements of carrying along electric bicycles or electric vehicles. In addition, other objects, desirable features, and characteristics will become apparent from the subsequent summary and detailed description, and the appended claims, taken in conjunction with the accompanying drawings and this background.

SUMMARY

A cargo carrier system is provided with a supporting frame for accommodating at least one object. The cargo carrier system is furthermore equipped with an energy supply device that makes it possible to supply an object accommodated or fixed on the supporting frame with electric energy. In this way, an object carried along on the motor vehicle by means of the cargo carrier system can be supplied with electric energy while it is carried along on the motor vehicle. This functionality is particularly suitable for electric bicycles and electric scooters, and for so-called self-balancing scooters that can be carried along in accordance with the specific cargo carrier configuration, e.g., on the rear end of a motor vehicle.

The cargo carrier system is universally arrangeable on the outside of the motor vehicle body, for example, in the form of a roof rack or a rear end rack. The supporting frame of the cargo carrier system is preferably arranged on the motor vehicle body such that it is displaceable or pulled out in approximately the longitudinal direction (x) of the vehicle, and accordingly designed to pull out of the rear end of a motor vehicle. In this case, the supporting frame is not realized in the form of a closed and structurally reinforced frame. It also may fulfill the function of a supporting structure only and have a corresponding geometric shape such as, e.g., a U-shaped design.

According to an embodiment, the energy supply device features a charging unit that is designed for charging at least one rechargeable battery of the object that is carried along. The energy supply device assigned to the cargo carrier system makes it possible, for example, to charge storage batteries or accumulators of an electric bicycle or a similar electric vehicle while it is carried along on the motor vehicle. In this case, the energy supply device receives power by the electrical system of the motor vehicle.

According to another embodiment, the supporting frame of the cargo carrier system advantageously features at least one plug-type connector for electrically coupling the object carried along to the energy supply device. When the object to be carried along such as, e.g., an electric bicycle, is mounted on the supporting frame or fixed on the cargo carrier system, respectively, it can be connected to the plug-type connector provided on the supporting frame, for example, via a charging cable.

In another embodiment, the plug-type connector is arranged on a crossbeam of the supporting frame that essentially extends in the lateral direction of the vehicle. In this case, it would be conceivable to arrange the plug connector or a charging socket, in particular, laterally of a license plate or license plate bracket.

According to another embodiment, the energy supply device is connected to a power supply that is already provided on the motor vehicle such as, e.g., to a taillight unit of the motor vehicle. For example, the energy supply device, particularly the charging unit, is powered by a wiring harness that leads to the taillight unit. The additional wiring expenditures for implementing the charging unit of the cargo carrier system are therefore reduced to a minimum.

According to another embodiment, it would also be possible to integrate an electric coupling between the supporting frame and the object to be fixed thereon into a mechanical locking device, by means of which the object, preferably an electric bicycle, is fixable on the supporting frame. In this way, an electrical connection between the energy supply device of the supporting frame and the rechargeable battery of the object is already available when the object is fixed mechanically on the supporting frame or on locking and fastening devices provided thereon.

Instead of a wired connection between the energy supply device of the supporting frame and the object to be carried along, it would be additionally or alternatively conceivable to provide the supporting frame with at least one electric coupling that is based on electric induction in order to also transmit electric energy to the object in an inductive fashion without direct electric contact between the rechargeable battery of the object and the energy supply device of the cargo carrier system. In this case, the supporting frame or locking means arranged thereon and the object to fix on the supporting frame need to be provided with corresponding inductive coupling.

According to another embodiment, it is furthermore proposed that the cargo carrier system features a control device or is coupled to a control device that controls the energy supply of the object in dependence on the state of motion of the motor vehicle. For example, the control device is designed for only supplying the object carried along and fixed on the cargo carrier system with electric energy when the motor vehicle generates excess electric energy. This would make it possible, for example, to restrict supply with a rechargeable bicycle battery carried along with electric energy in the partial load mode and/or during a braking maneuver of the motor vehicle. The bicycle accumulator is preferably charged during a recuperation process, namely during an energy feedback caused by the deceleration of the vehicle.

According to an additional embodiment, it would furthermore be conceivable to design the control device in such a way that the energy supply of the object is controlled in accordance with different priorities that correspond to respective user specifications. The user may specify, for example, that a rechargeable bicycle battery being carried along is charged in the most efficient and energy saving fashion possible. In this case, the rechargeable bicycle battery is chargeable only, for example, in operating situations of the motor vehicle, in which the charging of the accumulator does not or only barely affects the fuel consumption of the motor vehicle.

Depending on the user specifications, the object fixed on the cargo carrier system may also be supplied with electric energy with maximum priority. Depending on the conceptual design and the dimensions of a storage battery for the internal combustion engine, it would even be conceivable to at least temporarily supply a rechargeable battery being carried along on the cargo carrier system with electric energy from the storage battery of the motor vehicle only while the internal combustion engine is at a standstill. In this case, however, the control device ensures that the storage battery does not reach a critical state of charge for starting the internal combustion engine.

The control device may be integrated into the charging unit of the energy supply device or into the electronic system of the motor vehicle. The charging unit is preferably arranged on the supporting frame of the cargo carrier system and may, depending on the charging requirements of the rechargeable object battery and the available wiring system voltage, feature a suitable transformer in order to adapt the wiring system voltage of, for example, 24 Volt or 36 Volt to the voltage level required for charging the rechargeable battery.

According to another embodiment of the cargo carrier system, its supporting frame is arranged on the body of the motor vehicle such that it can be displaced between an idle position and an operative position, in which an object can be accommodated thereon, along the longitudinal direction (x) of the motor vehicle and locked in the operative position.

According to another embodiment, the supporting frame is guided through a bumper of the motor vehicle body and, in particular, is integrated into the outside contour of the motor vehicle body flush with adjacent areas when it reaches its idle position.

According to another embodiment, a motor vehicle body is equipped with an above-described cargo carrier system.

According to another embodiment, a motor vehicle that features an above-described cargo carrier system with an integrated energy supply device, e.g., for charging an electric vehicle being carried along.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and not intended to limit application and uses. Furthermore, there is no intention to be bound by any theory presented in the preceding background or summary or the following detailed description.

Figure 1:
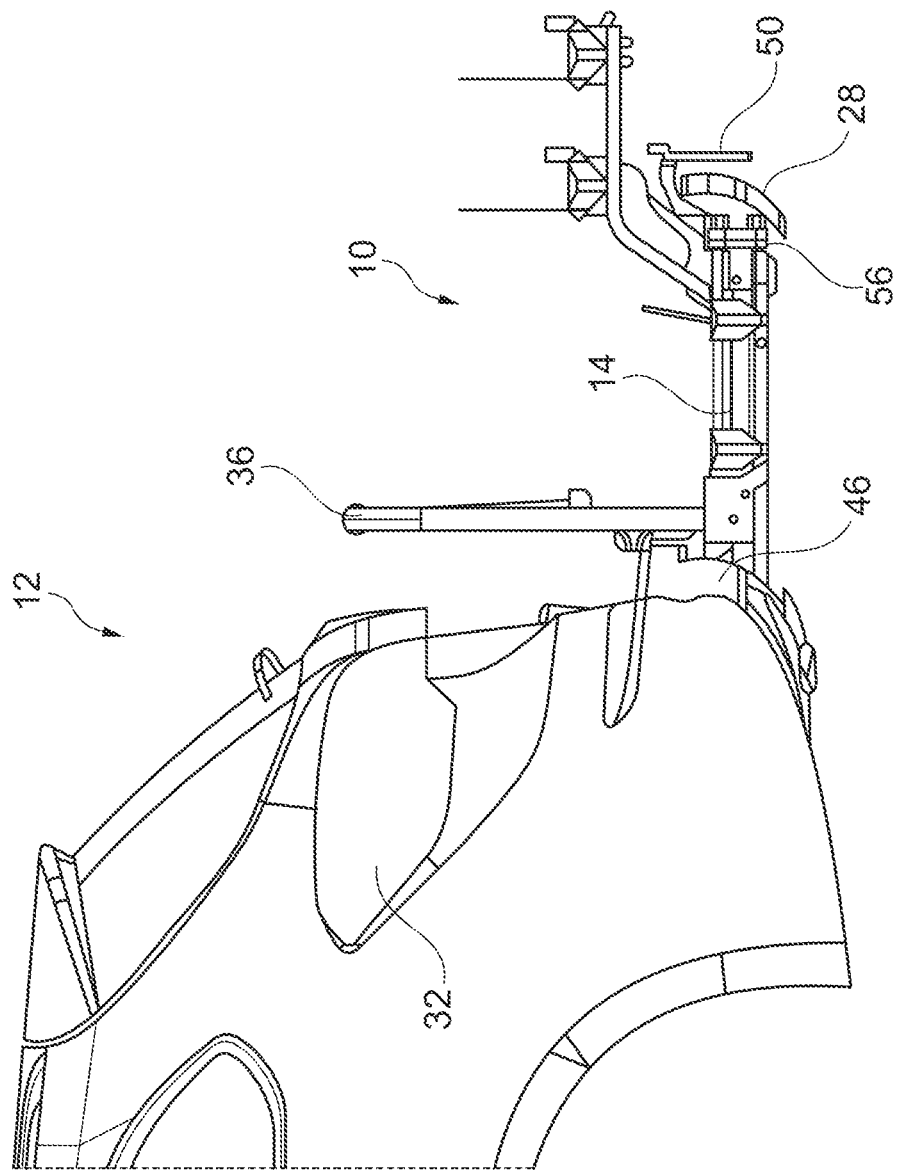
FIG. 1 shows a side view of the rear end of a motor vehicle with a cargo carrier system arranged thereon in its pulled-out operative position.

FIG. 1 shows a side view of the rear end 12 of a vehicle that is equipped with a cargo carrier system 10. The cargo carrier system 10 is illustrated in its normal position 42 in FIG. 2. The cargo carrier system 10 is illustrated in its operative position 44 in FIG. 3 and features a supporting frame 14 that is supported, e.g., on support rails 52 of the car body such that it can be displaced through a rear bumper 46 that is schematically illustrated in FIG. 1 in the longitudinal direction (x) of the vehicle.

Figure 3:
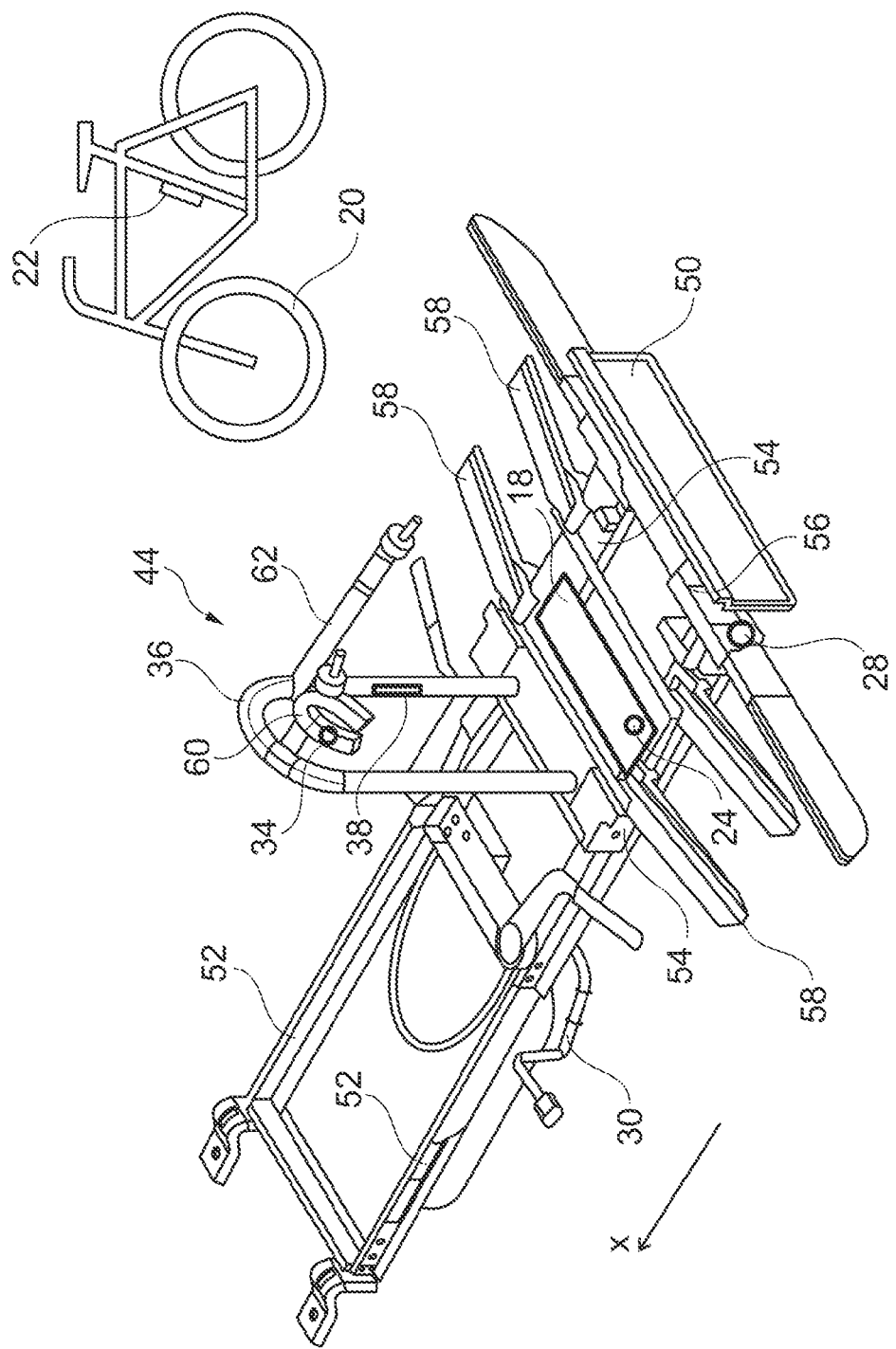
FIG. 3 shows the cargo carrier system according to FIG. 2 in the operative position.

The supporting frame 14 features two longitudinal beams 54 that are displaceably supported on the support rails 52 of the car body, as well as a crossbeam 56 that connects the rear ends of the longitudinal beams 54. The crossbeam 56 also serves for carrying a license plate 50. The supporting frame 14 is provided with various locking means such as, for example, an upright stand 36, or stand profiles 58 that can be folded out laterally in order to fix a bicycle 20 that is schematically illustrated in FIG. 3 on the supporting frame 14. Parts of the bicycle frame can be locked, in particular, by means of a fastening clip 60 provided on the stand 36 and/or with a cross brace 62.

Figure 4:
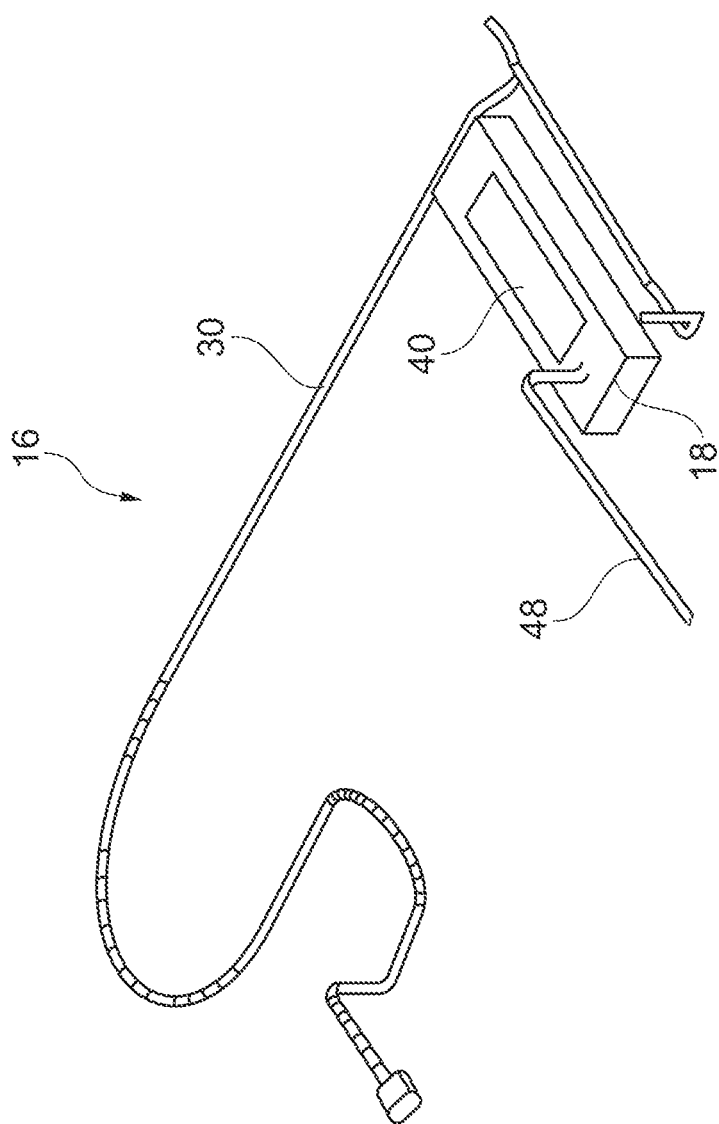
FIG. 4 shows an isolated representation of the energy supply device of the illustrated cargo carrier system.

The supporting frame 14 is further provided with an energy supply device 16 that is illustrated in an isolated fashion in FIG. 4, and features a charging unit 18, as well as various electric lines. The charging unit 18 is supplied with electric energy via a supply line 30 that also serves for realizing the energy supply for the two headlight modules 32 of the motor vehicle. The charging unit 18 therefore is able to tap electric energy from a taillight wiring harness 30.

Figure 2:
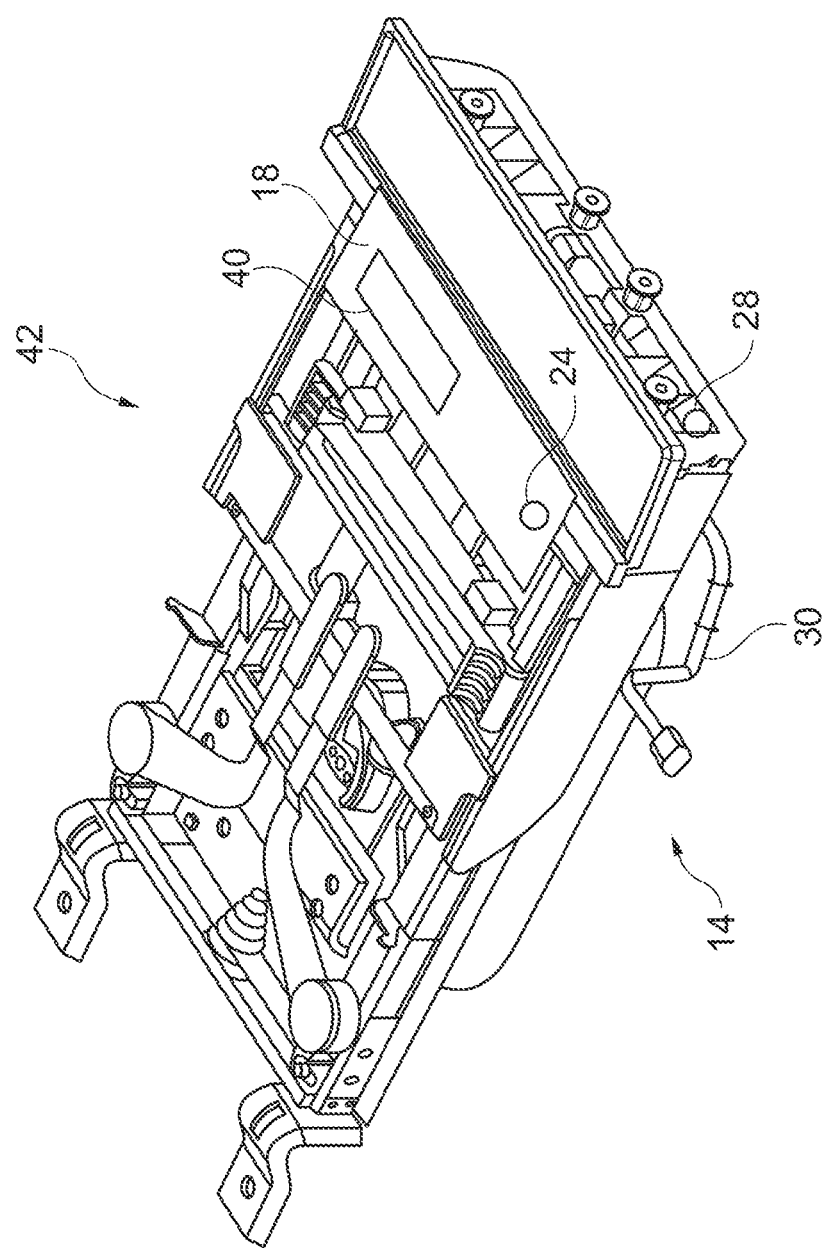
FIG. 2 shows an isolated perspective representation of the cargo carrier system in its normal position.

FIG. 2 and FIG. 4 furthermore show a control device 40 that may be integrated into the charging unit 18 or otherwise into the electronic system of the vehicle as illustrated in the figures. FIG. 4 also shows a charging cable 48 that originates at the charging unit 18 and makes it possible to supply, for example, one or more charging sockets 28, 34 that are illustrated in an exemplary fashion in FIG. 3 with a suitable charging current for charging the bicycle accumulator 22.

However, it would also be conceivable to provide a charging socket 24 directly on the charging unit 18 instead of the charging cable 48, wherein a charging cable to be connected to the bicycle accumulator 22 can be inserted into said charging socket as needed. Instead of producing a direct electrical connection between the rechargeable bicycle battery 22 and the energy supply device 16, particularly its charging unit 18, it would also be possible to couple the energy supply device 16 to the rechargeable bicycle battery 22 in an inductive fashion. In this case, the charging cable 48 illustrated in FIG. 4 supplies, for example, an inductive charging module 38 arranged on the stand 36.

Since several sockets 24, 28, 34 or even several inductive coupling modules 38 may be arranged on the cargo carrier system 10, it would also be possible, in principle, to not only charge a single bicycle 20 or electric scooter, but also to simultaneously charge several bicycles or electric scooters, as well as several bicycle accumulators 22. In this case, the arrangement and configuration of the individual charging sockets 24, 28, 34 can be adapted to the configuration of the respective object 20.

For example, a charging socket 28 that is arranged on the crossbeam 56 in the vicinity of the license plate is particularly suitable for charging a bicycle 20 that is locked in a rear position referred to the driving direction while the charging socket 34 that is integrated into the fastening clip 60, as well as the charging socket 24 that is integrated into the charging unit 18, may serve for charging a bicycle 20 arranged in the front position. If the bicycle 20 is equipped accordingly, it would be possible, in particular, to already electrically contact the rechargeable bicycle battery 22 and the charging socket 34 when the bicycle is mechanically locked on the fastening clip 60 such that the user does not have to produce a separate electrical connection between the rechargeable battery and the energy supply device 16 of the cargo carrier.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle, comprising:
   a cargo carrier system, comprising:
      a supporting frame configured to accommodate an object;
      an energy supply device configured to supplying the object with electric energy; and
   a battery; and
   a controller configured to control the energy supply device, wherein the controller is configured to:
      supply, when the controller is in a first user selected mode, the object with electric energy from the energy supply device when the motor vehicle is generating excess electric energy,
      supply, when the controller is in a second user selected mode, the object with electric energy from the battery when the motor vehicle is at a standstill and a voltage level of the battery is greater than a predetermined threshold.

2. The motor vehicle according to claim 1, wherein the energy supply device comprises a charging unit that is configured to charge a rechargeable battery of the object.

3. The motor vehicle according to claim 1, further comprising a one plug-type connector on the supporting frame that is configured to electrically couple the object to the energy supply device.

4. The motor vehicle according to claim 3, wherein the one plug-type connector is arranged on a crossbeam of the supporting frame that extends in an essentially lateral direction of the motor vehicle.

5. The motor vehicle according to claim 1, wherein the energy supply device is connected to an existing power supply of a taillight unit of the motor vehicle.

6. The motor vehicle according to claim 1, wherein an electric coupling between the supporting frame and the object is integrated into a mechanical locking device that is configured to fix the object on the supporting frame.

7. The motor vehicle according to claim 1, wherein the supporting frame comprises an electric coupling that is based on an electric induction in order to supply the object with the electric energy.

8. The motor vehicle according to claim 1, wherein the supporting frame is displaceable between an idle position and a pulled-out operative position along a longitudinal direction of the motor vehicle.

9. The motor vehicle according to claim 1, wherein the supporting frame is configured to be guided through a bumper of a body of the motor vehicle.

* * * * *